United States Patent
Zhan (10) Patent No.: US 9,177,529 B2
(45) Date of Patent: Nov. 3, 2015

(54) METHOD AND DEVICE FOR DETERMINING AFTERIMAGE LEVEL OF DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yujuan Zhan, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/364,469

(22) PCT Filed: Jun. 27, 2013

(86) PCT No.: PCT/CN2013/078092
§ 371 (c)(1),
(2) Date: Jun. 11, 2014

(87) PCT Pub. No.: WO2014/139239
PCT Pub. Date: Sep. 18, 2014

(65) Prior Publication Data
US 2015/0154939 A1 Jun. 4, 2015

(30) Foreign Application Priority Data

Mar. 12, 2013 (CN) ............ 2013 1 0078918

(51) Int. Cl.
*G09G 5/10* (2006.01)
*G09G 3/00* (2006.01)
(Continued)

(52) U.S. Cl.
CPC .. *G09G 5/10* (2013.01); *G06T 7/00* (2013.01); *G06T 7/408* (2013.01); *G09G 3/00* (2013.01); *G09G 2320/0233* (2013.01); *G09G 2320/04* (2013.01)

(58) Field of Classification Search
None
See application file for complete search history.

(56) References Cited

U.S. PATENT DOCUMENTS

2003/0214586 A1 11/2003 Lee et al.
2008/0068359 A1* 3/2008 Yoshida et al. ............... 345/204
(Continued)

FOREIGN PATENT DOCUMENTS

| CN | 101655409 A | 2/2010 |
| CN | 103165057 A | 6/2013 |
| KR | 20030089785 A | 11/2003 |

OTHER PUBLICATIONS

Korean Office Action dated Mar. 23, 2015; Appln. No. 10-2014-7017367.
(Continued)

*Primary Examiner* — James A Thompson
(74) *Attorney, Agent, or Firm* — Ladas & Parry LLP (57) ABSTRACT

A method for determining the afterimage level of a display is used for solving the problem in the conventional technology that the accuracy is very low as the afterimage level of the display can only be determined by human-eye observation. The method comprises: determining a brightness variation index and an area index of an afterimage displayed by the display device after an afterimage test; and determining the afterimage level of the display device according to the determined brightness variation index and the determined area index. Because both the brightness variation index and the area index of the afterimage can be determined objectively, the means of human-eye subjective observation is not required any more and the afterimage level of the display can be determined objectively, and hence the accuracy of determining the afterimage level of the display can be improved.

12 Claims, 3 Drawing Sheets

| Y(b1) | Y(b1) | Y(b1) | Y | Y |
|---|---|---|---|---|
| Y(b1) | Y(b1) | Y(b1) | Y(b2) | Y(b2) |
| Y | Y | Y | Y(b2) | Y(b2) |

(51) Int. Cl.
*G06T 7/00* (2006.01)
*G06T 7/40* (2006.01)

(56) References Cited

U.S. PATENT DOCUMENTS

2011/0234814 A1* 9/2011 Kobayashi ............... 348/189
2013/0002733 A1* 1/2013 Origuchi et al. ............ 345/690
2013/0229444 A1* 9/2013 Teranishi et al. ........... 345/690

OTHER PUBLICATIONS

Written Opinion of the International Searching Authority dated Dec. 9, 2013; PCT/CN2013/078092.

* cited by examiner

| Y(b1) | Y(b1) | Y(b1) | Y | Y |
|---|---|---|---|---|
| Y(b1) | Y(b1) | Y(b1) | Y(b2) | Y(b2) |
| Y | Y | Y | Y(b2) | Y(b2) |

FIG. 1

| Y(b1) | Y(w1) | Y(b1) | Y | Y |
|---|---|---|---|---|
| Y(w1) | Y(b1) | Y(w1) | Y(w2) | Y(b2) |
| Y | Y | Y | Y(b2) | Y(w2) |

METHOD AND DEVICE FOR DETERMINING AFTERIMAGE LEVEL OF DISPLAY DEVICE

TECHNICAL FIELD

Embodiments of the present invention relate to the technical field of display, in particular to a method and a device for determining the afterimage level of a display device.

BACKGROUND

Along with the popularity of flat-panel displays, consumers have increasingly higher demands upon the flat-panel displays, and flat-panel display manufacturers increasingly focus on the improvement of product quality. But the afterimage problem always affects the image quality of flat-panel displays.

Afterimage refers to a phenomenon in which, when a display device is switched to another image after an image is displayed by the display device for a long time, a ghosting image of the previous image will be left on the display device. Liquid crystal display (LCD), as one of the flat-panel display, will have residual charges due to the action of an external electric field after displaying an image for a long time, thus the LCD cannot completely display a new image when being switched to display another image and an afterimage of the original image is still left thereon, and hence the display effect of the LCD can be affected. Other flat-panel displays such as plasma display panel TV also have the similar phenomenon.

Currently, a conventional technology mainly evaluates an afterimage level by the visual comparison with an afterimage level sample. The method for determining the afterimage level by human eyes suffers from strong subjectivity, namely the determination of results is often different due to the visual difference of different people, so that the afterimage levels determined by different people are different as well, and hence the image quality of the display cannot be accurately determined, and consequently the manufacturer cannot improve the display device.

In summary, the afterimage level of a display device can be determined by human-eye observation only, and hence the accuracy is very low.

SUMMARY

Embodiments of the present invention provide a method and a device for determining the afterimage level of a display device, which are used for solving the problem in the conventional technology that the accuracy is very low as the afterimage level of the display can only be determined by human-eye observation.

An embodiment of the present invention provides a method for determining the afterimage level. The method comprises: determining a brightness variation index and an area index of an afterimage displayed by the display device after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to a percentage of an area of the afterimage with respect to a display area of the display device; and determining the afterimage level of the display device according to the determined brightness variation index and the determined area index.

In one example, the brightness value of the display device before the afterimage test is the brightness value of the display device in the case of displaying an image having a single color value.

In one example, determining of the afterimage level of the display device according to the determined brightness variation index and the determined area index comprises: determining the afterimage level of the display device according to the product of the determined brightness variation index and the determined area index of the afterimage.

In one example, the brightness difference of the afterimage is determined by the following steps: if an image displayed by the display device in the afterimage test is an image having a single color value, taking a brightness value of the afterimage displayed by the display device after the afterimage test, and taking an absolute value of a difference value between the brightness value and the brightness value of the display device before the afterimage test as the brightness difference corresponding to the brightness value; or if the image displayed by the display device in the afterimage test comprises a black image and a white image, taking brightness values of a group of afterimages corresponding to the black image and the white image after the afterimage test, and taking an absolute value of a difference value between the brightness values of the group of afterimages corresponding to the black image and the white image as the brightness difference corresponding to the brightness value of the group.

In one example, the step of determining the afterimage level of the display device according to the determined brightness variation index and the determined area index when the image displayed by the display device in the afterimage test is the image having a single color value comprises: if the afterimage displayed by the display has more than two brightness values after the afterimage test, as to one of the brightness values, determining the brightness variation index corresponding to the brightness value in accordance with the brightness difference corresponding to the brightness value, and obtaining the afterimage index corresponding to the brightness value in accordance with the product of the brightness variation index corresponding to the brightness value and the area index of the afterimage having the brightness value; and determining the afterimage level according to a result obtained by the addition of the afterimage indexes corresponding to all the brightness values.

In one example, the step of determining the brightness difference corresponding to each group of brightness values if the image displayed by the display device in the process of afterimage test includes the black images and the white images comprises: selecting blocks in which afterimage occurs from all the blocks of the image displayed by the display device after the afterimage test, and determining the brightness value corresponding to each block in which afterimage occurs, in which each block in all the blocks only includes an afterimage of the black image or only includes an afterimage of the white image or does not include any afterimage; combining blocks with a same brightness value in all the blocks into an afterimage area; and combining an afterimage area of one black image and an afterimage area of one white image into an afterimage group, and as to one afterimage group, taking a difference value between brightness values of afterimages corresponding to the afterimage area of the black image and the afterimage area of the white image in the group as the brightness difference corresponding to the group, in which a difference value between an absolute value of a difference value between a brightness value corresponding to the afterimage area of the black image in a group and a brightness value of the image displayed by the display device before the afterimage test and an absolute value of a difference value between a brightness value corresponding to the afterimage area of the white image in the same group and the brightness value of the image displayed by the display device before the afterimage test is within a predetermined range. The step of determining the afterimage level of the display device according to the determined brightness variation index and the determined area index comprises: as to an afterimage group, according to the brightness difference corresponding to the afterimage group, determining the brightness variation index corresponding to the brightness difference, and obtaining an afterimage index corresponding to the afterimage group according to the product of the brightness variation index corresponding to the afterimage group and the area index corresponding to the afterimage group; and determining the afterimage level according to a result obtained from the addition of the afterimage indexes corresponding to all the afterimage groups.

An embodiment of the present invention provides a device for determining the afterimage level, which comprises: a first determination module configured to determine a brightness variation index and an area index of an afterimage displayed by the display device after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to a percentage of an area of the afterimage with respect to a display area of the display device; and a second determination module configured to determine the afterimage level of the display device according to the determined brightness variation index and the determined area index.

In one example, the brightness value of the display device before the afterimage test, determined by the first determination module, is the brightness value of the display device in the case of displaying an image having a single color value.

In one example, the second determination module is configured to determine the afterimage level of the display device according to the product of the determined brightness variation index and the determined area index of the afterimage.

In one example, the first determination module is configured to: if an image displayed by the display device in the afterimage test is an image having a single color value, take a brightness value of the afterimage displayed by the display device after the afterimage test, and take an absolute value of a difference value between the brightness value and the brightness value of the display device before the afterimage test as the brightness difference corresponding to the brightness value; and if the image displayed by the display device in the afterimage test comprises a black image and a white image, take brightness values of a group of afterimages corresponding to the black image and the white image after the afterimage test, and take an absolute value of a difference value between the brightness values of the group of afterimages corresponding to the black image and the white image as the brightness difference corresponding to the brightness value of the group.

In one example, when the image displayed by the display device in the afterimage test is the image having a single color value, the first determination module is configured to: if the afterimage displayed by the display has more than two brightness values after the afterimage test, take one of the brightness values, determine the brightness variation index corresponding to the brightness value in accordance with the brightness difference corresponding to the brightness value, obtain the afterimage index corresponding to the brightness value in accordance with the product of the brightness variation index corresponding to the brightness value and the area index of the afterimage having the brightness value, and finally determine the afterimage level according to a result obtained by the addition of the afterimage indexes corresponding to all the brightness values.

In one example, if the image displayed by the display device in the afterimage test comprises a black image and a white image, the first determination module is configured to: select blocks in which afterimage occurs from all the blocks of the image displayed by the display device after the afterimage test, and determine the brightness value corresponding to each block in which afterimage occurs, in which each block in all the blocks only includes an afterimage of the black image or only includes an afterimage of the white image or does not include any afterimage; combine blocks with a same brightness value in all the blocks into an afterimage area; and combine an afterimage area of one black image and an afterimage area of one white image into an afterimage group, take one afterimage group, and take a difference value between brightness values of afterimages corresponding to the afterimage area of the black image and the afterimage area of the white image in the group as the brightness difference corresponding to the group, in which a difference value between an absolute value of a difference value between a brightness value corresponding to the afterimage area of the black image in the same group and the brightness value of the image displayed by the display device before the afterimage test and an absolute value of a difference value between a brightness value corresponding to the afterimage area of the white image in the same group and the brightness value of the image displayed by the display device before the afterimage test is within a predetermined range. The second determination module is configured to, as to an afterimage group, determine the brightness variation index corresponding to the brightness difference according to the brightness difference corresponding to the afterimage group, and obtain an afterimage index corresponding to the afterimage group according to the product of the brightness variation index corresponding to the afterimage group and the area index corresponding to the afterimage group; and determine the afterimage level according to a result obtained from the addition of the afterimage indexes corresponding to all the afterimage groups.

Embodiments of the present invention determines the afterimage level of the display device by determining a brightness variation index and an area index of an afterimage displayed after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to the percentage of the area of the afterimage with respect to the display area of the display. Because both the brightness variation index and the area index of the afterimage can be determined objectively, by adoption of the embodiment of the present invention, the means of human-eye subjective observation is not required any more and the afterimage level of the display can be determined objectively, and hence the accuracy of determining the afterimage level of the display can be improved.

DETAILED DESCRIPTION

The embodiments of the present invention determine an afterimage level of a display device by determining a brightness variation index and an area index of the afterimage displayed after an afterimage test, the brightness variation index of the afterimage refers to the percentage of the brightness difference of the afterimage displayed by the display device after the afterimage test with respect to the brightness value of the display device before the afterimage test, and the area index of the afterimage refers to the percentage of the area of the afterimage with respect to the display area of the display device. Because both the brightness variation index and the area index of the afterimage can be determined objectively, with the embodiments of the present invention, the process with the aid of human-eye observation is not required any more, and the afterimage level of the display can be determined objectively, and hence the accuracy of determining the afterimage level of the display can be improved.

Further detailed description will be given to the embodiments of the present invention with reference to the accompanying drawings.

The method for determining the afterimage level provided by an embodiment of the present invention comprises the following steps:

S101: determining a brightness variation index and an area index of an afterimage displayed after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to a percentage of an area of the afterimage with respect to a display area of the display device; and S102: determining the afterimage level of the display device according to the determined brightness variation index and the determined area index of the afterimage.

For instance, the brightness value of the display device before the afterimage test is the brightness value of the display device in the case of displaying an image having a single color value.

In the step S101, the image of a single color value, namely the image having an unique color value, is displayed on the display before the afterimage test upon the display device, for instance, an all-gray image having the color value (127, 127, 127) can be selected; subsequently, the brightness value of the display device at this point may be tested by an optical test equipment; an image which has an unique color value and has a different brightness value from that before the afterimage test may be selected as a test image in the afterimage test, for instance, an all-black image having the color value (0, 0, 0) or an all-white image having the color value (255, 255, 255) can be selected. An image having two different color values may also be selected as the test image, for instance, a test image having black areas and white areas at the same time can be selected, for example, a black-and-white checkerboard image may be selected as the test image. After the test ends, the image to be displayed is switched to the image displayed before the afterimage test, for instance, switched to the previous all-gray image having the color value (127, 127, 127); at this point, the image displayed by the display may suffer from an afterimage; and the afterimage level of the display can be determined according to the brightness variation index and the area index of the afterimage.

For instance, the step of determining the afterimage level of the display device according to the determined brightness variation index and the determined area index comprises: determining the afterimage level of the display device according to the product of the determined brightness variation index and the determined area index of the afterimage.

In one embodiment, the brightness variation index and the area index of the afterimage may be individually used to indicate the afterimage level, that is to say, the afterimage level of the display device may be determined only by the brightness variation index or only by the area index; and the brightness variation index and the area index of the afterimage may also be combined in consideration, namely the afterimage level of the display device is determined by the product of the brightness variation index and the area index. Herein, the product of the brightness variation index and the area index is referred to as an afterimage index. In one embodiment, the afterimage levels corresponding to different afterimage indexes may be preset according to actual conditions. For instance, an afterimage index of less than 0.1 is defined as the first level of afterimages; an afterimage index between 0.1 and 0.2 is defined as the second level of afterimages; . . . the higher the afterimage level is, the poorer the display effect of the display is.

For instance, two ways for determining the brightness difference of the display may be provided in the following.

First way: if an image displayed by the display device in the afterimage test is an image having a single color value, taking a brightness value of the afterimage displayed by the display device after the afterimage test, and taking an absolute value of a difference value between the brightness value after the afterimage test and the brightness value of the display device before the afterimage test as the brightness difference corresponding to the brightness value after the afterimage test.

In one embodiment, if the test image is an image having an unique color value, the brightness difference of the afterimage displayed by the display device after the afterimage test may be an absolute value of a difference value between the brightness value of the afterimage displayed by the display device after the afterimage test and the brightness value of the display device before the afterimage test. It should be noted that: if the brightness value of the afterimage after the afterimage test is unique, there is only one brightness difference here; and if the afterimage displayed after the afterimage test has a plurality of brightness values, an absolute value is obtained by the subtraction of each brightness value of the afterimage to the brightness value before the afterimage test, and the brightness difference corresponding to each brightness value is obtained, namely the afterimage displayed by the display device has a plurality of brightness differences. Herein, "the afterimage having the plurality of brightness values" may refer to that the afterimage has a plurality of brightness mean values. That is to say, the image displayed by the display device is divided into a plurality of blocks; afterimage blocks are determined after the afterimage test; each afterimage block has a brightness mean value; all the afterimage blocks give rise to a plurality of different brightness mean values; and the block here may be checkerboard or the like.

For instance, the step of determining the afterimage level of the display device according to the determined brightness variation index and the determined area index if the image displayed by the display device in the afterimage test is the image having a single color value comprises:

if the afterimage displayed by the display has more than two brightness values after the afterimage test, as to one of the brightness values, determining the brightness variation index corresponding to the brightness value in accordance with the brightness difference corresponding to the brightness value, and obtaining the afterimage index corresponding to the brightness value in accordance with the product of the brightness variation index corresponding to the brightness value and the area index of the afterimage having the brightness value; and determining the afterimage level according to a result obtained by the addition of the afterimage indexes corresponding to all the brightness values.

Figure 1:
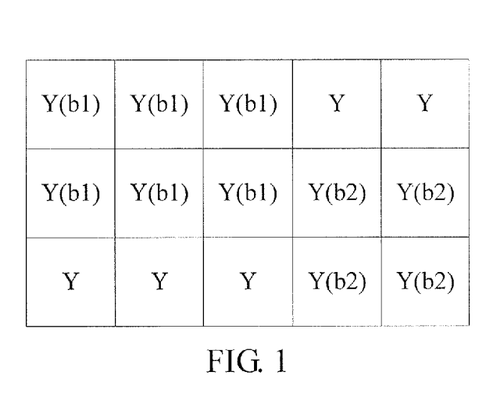
FIG. 1 is a schematic diagram of an image with an afterimage displayed by a display device after the afterimage test on the display device with a black checkerboard image according to an embodiment of the present invention.

In one embodiment, if the afterimage displayed by the display device after the afterimage test has more than two brightness values, each brightness value is taken; the afterimage index corresponding to each brightness value is determined according to the above steps; the afterimage indexes corresponding to all the brightness values are added together; and the afterimage level of the display device is determined according to the addition result. The brightness value here may be a brightness mean value. For instance, an all-gray image having the color value (127, 127, 127) is displayed by the display before the afterimage test; the brightness value of the display before test is Y; a black checkerboard image is selected as a test image in the afterimage test; and after the afterimage test, namely after the afterimage test has been performed and the color value(s) of the image displayed by the display is switched to the color value(s) before the afterimage test, an image suffering from an afterimage is displayed by the display. FIG. 1 illustrates the image suffering from the afterimage displayed by the display device after the afterimage test upon the display with a black checkerboard image, and each checkerboard has one brightness mean value; the afterimage is displayed in 10 checkerboards and has two brightness mean values Y(b1) and Y(b2), namely the afterimage displayed by the display device after the afterimage test have two brightness values; as to the brightness value Y(b1), the brightness variation index corresponding to the brightness value is A1=|Y(b1)−Y|/Y; the number of checkerboards with the brightness value Y(b1) is 6; as the total display area of the display is 15 checkerboards, the area index corresponding to the brightness value Y(b1) is B1=6/15. Similarly, the brightness variation index corresponding to the brightness value Y(b2) is A2=|Y(b2)−Y1|/Y, and the area index corresponding to the brightness value Y(b2) is B2=4/15. The sum of the afterimage indexes corresponding to all the brightness values of the afterimage displayed by the display is $S_Q=A1\times B1+A2\times B2$; and the afterimage level of the display device is determined according to the obtained $S_Q$ value.

Second way: if the image displayed by the display device in the afterimage test comprises a black image and a white image, taking brightness values of a group of afterimages corresponding to the black image and a group of afterimages corresponding to the white image after the afterimage test, and taking an absolute value of a difference value between the brightness values of the group of afterimages corresponding to the black image and the white image as the brightness difference corresponding to the brightness values of the group.

In one embodiment, if a black image and a white image are taken as test images, the brightness difference of the display device after the afterimage test may be the difference value between the brightness values of afterimages of the two images after the afterimage test. For instance, when afterimages of the black image and the white image, displayed by the display device after the afterimage test, have a single brightness value respectively, the absolute value of the difference value between the brightness value of the afterimage of the black image and the brightness value of the afterimage of the white image can be taken as the brightness difference of the afterimage displayed by the display device. If the afterimages of the black image and the white image, displayed by the display device after the afterimage test, have a plurality of brightness values respectively or the afterimage of the black image or the white image has a plurality of brightness values, the afterimage displayed by the display device after the afterimage test is divided into different afterimage groups. In each group, an afterimage of the black image has a same brightness value and an afterimage of the white image has a same brightness value; and the presented degrees of the afterimages of the black image and the white image in the same group are close, namely an absolute value of the difference value between the brightness value of the afterimage of the black image and the brightness value of the display device before the afterimage test is close to an absolute value of the difference value between the brightness value of the afterimage of the white image and the brightness value of the display device before the afterimage test.

For instance, the step of determining the brightness difference corresponding to each group of brightness values if the image displayed by the display device in the process of afterimage test includes the black images and the white images comprises:

selecting blocks in which afterimage occurs from all the blocks of the image displayed by the display device after the afterimage test, and determining the brightness value corresponding to each block in which afterimage occurs, in which each block in all the blocks only includes an afterimage of the black image or only includes an afterimage of the white image or does not include any afterimage;

combining blocks with a same brightness value in all the blocks into an afterimage area; and combining an afterimage area of one black image and an afterimage area of one white image into an afterimage group, and as to one afterimage group, taking a difference value between brightness values of afterimages corresponding to the afterimage area of the black image and the afterimage area of the white image in the group as the brightness difference corresponding to the group, in which a difference value between an absolute value of a difference value between a brightness value corresponding to the afterimage area of the black image in the same group and the brightness value of the image displayed by the display device before the afterimage test and an absolute value of a difference value between a brightness value corresponding to the afterimage area of the white image in the same group and the brightness value of the image displayed by the display device before the afterimage test is within a predetermined range.

The step of determining the afterimage level of the display device according to the determined brightness variation index and the determined area index comprises:

as to an afterimage group, according to the brightness difference corresponding to the afterimage group, determining the brightness variation index corresponding to the brightness difference; obtaining an afterimage index corresponding to the afterimage group, according to the product of the brightness variation index corresponding to the afterimage group and the area index corresponding to the afterimage group; and determining the afterimage level according to a result obtained from the addition of the afterimage indexes corresponding to all the afterimage groups.

Figure 2:
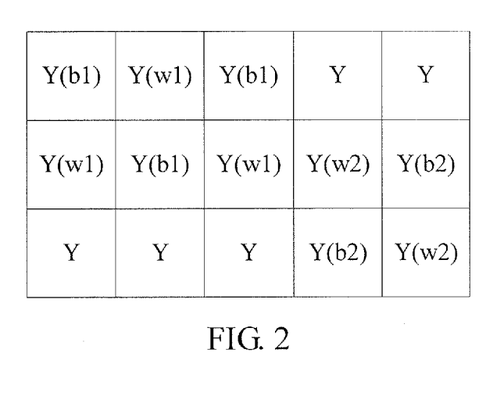
FIG. 2 is a schematic diagram of an image with an afterimage displayed by the display device after the afterimage test on the display device with a black-and-white checkerboard image according to an embodiment of the present invention.
Figure 3:
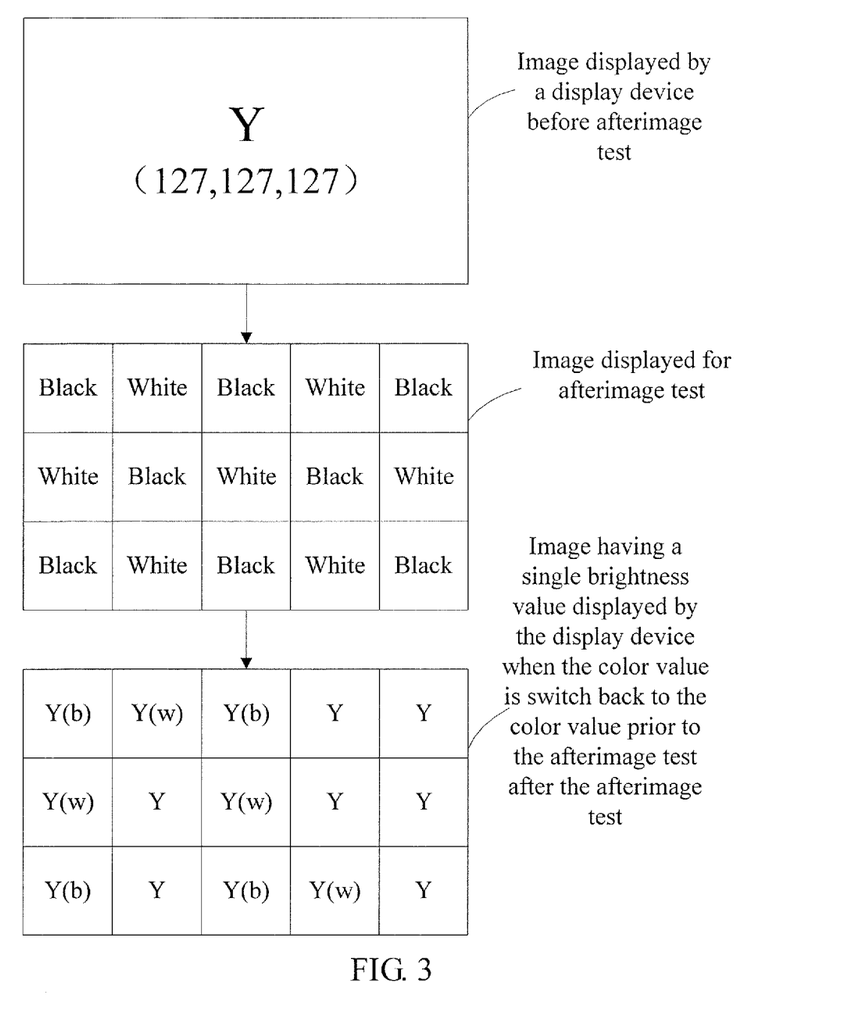
FIG. 3 is a schematic diagram of an afterimage having a single brightness value displayed by the display device after the afterimage test.
Figure 4:
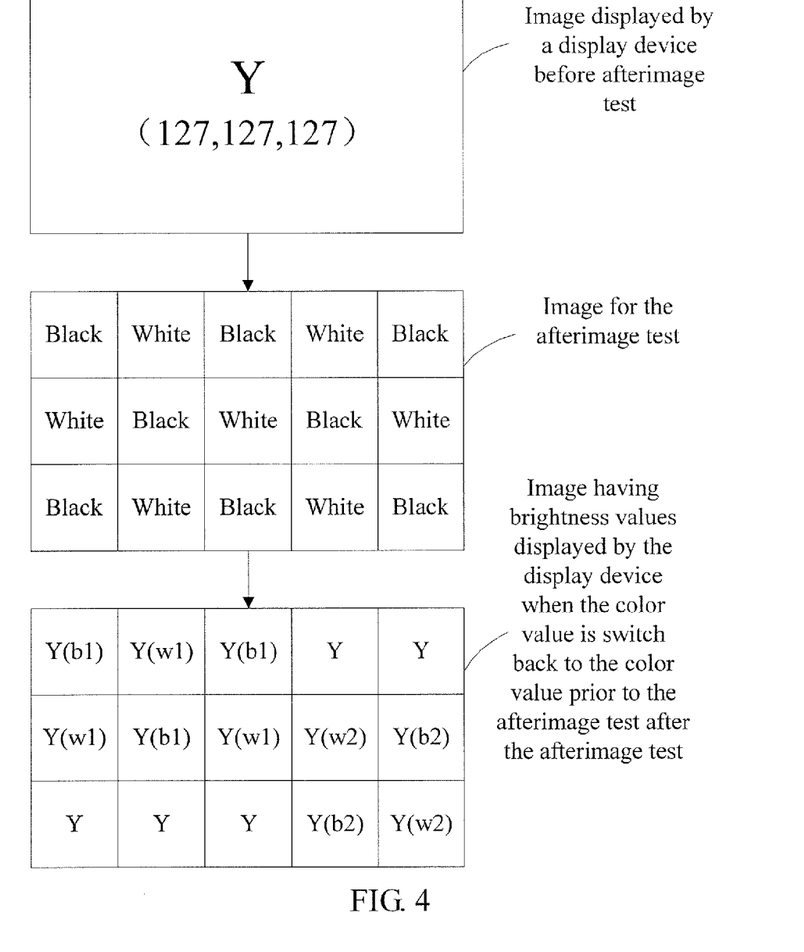
FIG. 4 is a schematic diagram of an afterimage having a plurality of brightness values displayed by the display device after the afterimage test.

In one embodiment, the blocks in the above steps may be of a shape of stripe, round, square or the like, for instance, may be in a checkerboard as illustrated in FIGS. 2 and 3. In the figure, each checkerboard unit area corresponds to a brightness value. The brightness value here refers to the brightness mean value of all the pixels corresponding to each checkerboard unit area. The afterimages of the black image and the white image after the afterimage test may have only one brightness value respectively. Here, a difference value between the brightness values of the afterimages of the black image and the white image is determined; and then the brightness variation index and the area index of the afterimage is determined; and accordingly the afterimage index of the display device can be determined. If the afterimage of at least one image out of the black image and the white image has more than two brightness values after the afterimage test, blocks with a same brightness value may be classified (or combined) into an afterimage area after blocks in which afterimage occurs and the brightness value of each block are determined. As the afterimage of the black image and the afterimage of the white image have different brightness values, the afterimage of the black image and the afterimage of the white image belong to different afterimage areas respectively. At this point, for the afterimage area of each black image, an afterimage area of the white image, which matches with the afterimage area of the black image, is selected, and the two afterimage areas are combined into an afterimage group; an absolute value of a difference value between the brightness values of the afterimages of the black image and the white image in an afterimage group is taken as the brightness value corresponding to the afterimage group, and hence the brightness variation index corresponding to the afterimage group can be determined. FIG. 3 illustrates an image with an afterimage displayed by the display device after the afterimage test on the display device with a black-and-white checkerboard image. In the total 15 blocks of the image displayed by the display device, the afterimage appears in 10 blocks; Y(b1) and Y(b2) each are brightness values of the afterimage of a black image; Y(w1) and Y(w2) each are brightness values of the afterimage of a white image; the blocks with the same brightness value Y(b1) are combined into an afterimage area; similarly, the blocks with the same brightness values Y(b2), Y(w1) and Y(w2) are combined into respective afterimage areas; the afterimage of a white image matching with the afterimage of a black image is determined, and the afterimages are combined into an afterimage group. For instance, the afterimage of the black image with the brightness value Y(b1) and the afterimage of the white image with the brightness value Y(w1) are combined into afterimage area 1; the afterimage of the black image with the brightness value Y(b2) and the afterimage of the white image with the brightness value Y(w2) are combined into afterimage area 2. Here, the image-sticking degrees presented by the afterimages of the black image and the white image in an afterimage group are close to each other, namely a difference value between an absolute value of a difference value between the brightness value of the afterimage of the black image and the brightness value of the display device before the afterimage test and an absolute value of a difference value between the brightness value of the afterimage of the white image and the brightness value of the display device before the afterimage test may be within or close to a predetermined range. As illustrated in FIG. 3, the area indexes of afterimage group 1 and afterimage group 2 are respectively 6/15 and 4/15, and the sum $S_Q$ of the afterimage indexes corresponding to all the afterimage groups is:

$$S_Q = \left|\frac{Y(b1) - Y(w1)}{Y}\right| \times \frac{6}{15} + \left|\frac{Y(b2) - Y(w2)}{Y}\right| \times \frac{4}{15}$$

The afterimage level of the display device can be determined according to the determined $S_Q$ value and the predetermined corresponding relation between the afterimage index and the afterimage level.

The method for determining the afterimage level of the display device by performing afterimage test on the display with a black-and-white checkerboard image, provided by an embodiment of the present invention, comprises the following steps:

S401: displaying an image having a single color value on the display device and testing the brightness value of the display device at this point.

Figure 5:
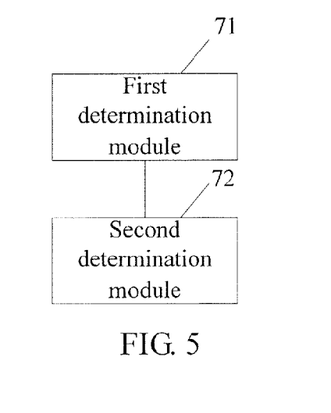
FIG. 5 is a structural view of a device for determining the afterimage level according to an embodiment of the present invention.

In one embodiment, an all-gray image having the color value (127, 127, 127) as illustrated in FIGS. 5 and 6 may be selected, and the brightness value Y of the display device at this point is detected by an optical test equipment.

S402: performing an afterimage test on the display device with a black-and-white checkerboard image.

The checkerboard image is as illustrated in FIGS. 5 and 6.

Step 403: after the afterimage test, switching the image displayed by the display device to the image before the afterimage test; turning to step S404 when an afterimage having a single color value as illustrated in FIG. 5 is displayed by the display device at this point; or turning to step S406 when an afterimage with a plurality of color values as illustrated in FIG. 6 is displayed by the display device at this point.

FIG. 5 is a schematic diagram of the afterimage having a single brightness value displayed by the display device after the afterimage test, and FIG. 6 is a schematic diagram of the afterimage having a plurality of brightness values displayed by the display device after the afterimage test.

S404: testing brightness values Y(b) and Y(w) of afterimages of black squares and white squares in the white-and-white checkerboard image, determining the area index B of the displayed afterimage, and turning to step S405.

S405: determining the afterimage index Q of the display device according to the following formula and determining the afterimage level of the display device according to the determined afterimage index:

$$Q = \left|\frac{Y(b) - Y(w)}{Y}\right| \times B$$

S406: testing a plurality of brightness values of the afterimage of the black squares and a plurality of brightness values of the afterimage of the white squares in the original black-and-white checkerboard image.

As illustrated in FIG. 6, the brightness values of the afterimage of the black squares are Y(b1) and Y(b2), and the brightness values of the afterimage of the white squares are Y(w1) and Y(w2).

S407: combining the afterimages of all the black squares corresponding to a brightness value and the afterimages of all the white squares corresponding to a brightness value into an afterimage group according to an absolute value of a difference value between the brightness values of the afterimages of the black squares and the white squares and the brightness value of the display device before the afterimage test.

For instance, if the value |Y(b1)−Y| is close to the value |Y(w1)−Y| and the value |Y(b2)−Y1| is close to the value |Y(w2)−Y|, Y(b1) and Y(w1) are combined into afterimage group 1, and Y(b2) and Y(w2) are combined into afterimage group 2.

S408: as to an afterimage group, according to the brightness difference corresponding to the afterimage group, determining the brightness variation index corresponding to the brightness difference, and obtaining an afterimage index corresponding to the afterimage group according to the product of the brightness variation index corresponding to the afterimage group and the area index corresponding to the afterimage group.

S409: determining the afterimage level according to a result obtained from the addition of the afterimage indexes corresponding to all the afterimage groups.

As illustrated in FIG. 6, if the area index of the afterimage corresponding to afterimage group 1 is B1 and the area index of the afterimage corresponding to afterimage group 2 is B2, the sum $S_Q$ of the afterimage indexes corresponding to all the afterimage groups is:

$$S_Q = \left| \frac{Y(b1) - Y(w1)}{Y} \right| \times B1 + \left| \frac{Y(b2) - Y(w2)}{Y} \right| \times B2$$

Finally, the afterimage level of the display device is determined according to the determined $S_Q$ value. For instance, when the $S_Q$ value of the display device is less than 0.1, the afterimage level of the display device is determined to be first class or qualified.

On the basis of the same invention concept, the embodiments of the present invention further provides a device for determining the afterimage level corresponding to the method for determining the afterimage level. As the working principle of the device in solving the problem is similar to the method for determining the afterimage level provided by the embodiment of the present invention, the implementation of the device can refer to the implementation of the method. No further description will be given here.

FIG. 7 is a structural view of the device for determining the afterimage level provided by the embodiment of the present invention. As illustrated in FIG. 7, the device comprises:

a first determination module 71 configured to determine the brightness variation index and the area index of the afterimage displayed by a display device after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to a percentage of an area of the afterimage with respect to a display area of the display device; and a second determination module 72 configured to determine the afterimage level of the display device according to the determined brightness variation index and the determined area index of the displayed afterimage.

The device for determining the afterimage level of a display device provided by an embodiment of the present invention may be an assembly or combination formed by an optical test equipment, an afterimage test equipment, a computer control equipment and the like and may also be a device integrating optical test function, afterimage test function, control function, computing function and the like.

For instance, the brightness value of the display device before the afterimage test, which is determined by the first determination module 71, is the brightness value of the display device in the case of displaying an image having a single color value.

For instance, the second determination module 72 may be configured to determine the afterimage level of the display device according to the product of the determined brightness variation index and the determined area index of the afterimage.

For instance, the first determination module 71 may be configured to: when an image displayed by the display device in the afterimage test is an image having a single color value, take a brightness value of the afterimage displayed by the display device after the afterimage test, and take an absolute value of a difference value between the aforesaid brightness value and the brightness value of the display device before the afterimage test as the brightness difference corresponding to the brightness value; and if the image displayed by the display device in the afterimage test comprises a black image and a white image, take brightness values of a group of afterimages corresponding to the black image and the white image after the afterimage test, and take an absolute value of a difference value between the brightness values of the group of afterimages corresponding to the black image and the white image as the brightness difference corresponding to the brightness value of the group.

For instance, when the image displayed by the display device in the afterimage test is the image having a single color value, the first determination module 71 is configured to: when the afterimage displayed by the display has more than two brightness values after the afterimage test, take one of the brightness values, determine the brightness variation index corresponding to the brightness value in accordance with the brightness difference corresponding to the brightness value, obtain the afterimage index corresponding to the brightness value in accordance with the product of the brightness variation index corresponding to the brightness value and the area index of the afterimage having the brightness value, and finally determine the afterimage level according to a result obtained by the addition of the afterimage indexes corresponding to all the brightness values.

For instance, if the image displayed by the display device in the afterimage test includes a black image and a white image, then the first determination module 71 may be configured to: select blocks in which an afterimage occurs from all the blocks of the image displayed by the display device after the afterimage test, and determine the brightness value corresponding to each block in which the afterimage occurs, in which each block in all the blocks of the image displayed by the display device only includes an afterimage of the black image or only includes an afterimage of the white image or does not include any afterimage; combine blocks with a same brightness value in all the blocks into an afterimage area; and combine an afterimage area of one black image and an afterimage area of one white image into an afterimage group, and as to one afterimage group, take a difference value between the brightness values of afterimage corresponding to the afterimage area of the black image and the afterimage area of the white image in the group as the brightness difference corresponding to the group. A difference value between an absolute value of a difference value between a brightness value corresponding to the afterimage area of the black image in the same group and the brightness value of the image displayed by the display device before the afterimage test and an absolute value of a difference value between a brightness value corresponding to the afterimage area of the white image in the same group and the brightness value of the image displayed by the display device before the afterimage test is within a predetermined range; and then the second determination module 72 may be configured to, as to an afterimage group, determine the brightness variation index corresponding to the brightness difference according to the brightness difference corresponding to the afterimage group, and obtain an afterimage index corresponding to the afterimage group according to the product of the brightness variation index corresponding to the afterimage group and the area index corresponding to the afterimage group; and determine the afterimage level according to a result obtained from the addition of the afterimage indexes corresponding to all the afterimage groups.

It should be understood by those skilled in the art that the embodiments of the present invention may be embodied as a method, a system or a computer program product. Therefore, the present invention may be implemented completely in hardware, software or means combining software and hardware. Moreover, the present invention may adopt a computer program product implemented on one or more computer-usable storage media (including, but not limited to, disc memories, CD-ROM, optical memories, etc.) containing computer-usable program codes.

The present invention is described with reference to the flowcharts and/or block diagrams of the method, device (system) and computer program product of the embodiments of the present invention. It should be understood that each process and/or block in the flowchart and/or block diagram and the combination of the process and/or block in the flowchart and/or block diagram may be implemented by computer program instructions. The computer program instructions may be provided in a general purpose computer, a special purpose computer, an embedded processor or a processor of other programmable data processing equipment to produce a machine, so that the instructions executed through the computer or the processor of other programmable data processing equipment can be provided to produce a device for achieving the functions specified in one or more processes in the flowchart and/or one or more blocks in the block diagram.

The computer program instructions may also be stored into a computer-readable memory capable of guiding the computer or other programmable data processing equipment to work by specific means, so that the instructions stored into the computer-readable memory can be provided to produce a product of an instruction device. The instruction device is configured to achieve the functions specified in one or more processes in the flowchart and/or one or more blocks in the block diagram.

The computer program instructions may also be loaded to the computer or other programmable data processing equipment, so that a series of operation steps can be executed on the computer or other programmable equipment to produce computer-implemented processing, and hence the instructions executed on the computer or other programmable equipment provide steps for achieving the functions specified in one or more processes in the flowchart and/or one or more blocks in the block diagram.

Although the preferred embodiments of the present invention have been described, other variations and modifications may be made to the embodiments once those skilled in the art learn the basic creative concept. Therefore, the appended claims are indented to include the preferred embodiments and all the variations and modifications falling within the scope of the present invention.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The invention claimed is:

1. A method for determining an afterimage level of a display device, comprising:
   determining a brightness variation index and an area index of an afterimage displayed by the display device after an afterimage test, in which the brightness variation index of the afterimage refers to a percentage of a brightness difference of the afterimage displayed by a display device after the afterimage test with respect to a brightness value of the display device before the afterimage test, and the area index of the afterimage refers to a percentage of an area of the afterimage with respect to a display area of the display device; and
   determining the afterimage level of the display device according to the determined brightness variation index and the determined area index.

2. The method according to claim 1, wherein the brightness value of the display device before the afterimage test is a brightness value of the display device in the case of displaying an image having a single color value.

3. The method according to claim 1, wherein determining of the afterimage level of the display device according to the determined brightness variation index and the determined area index comprises:
   determining the afterimage level of the display device according to a product of the determined brightness variation index and the determined area index of the afterimage.

4. The method according to claim 1, wherein the brightness difference of the afterimage is determined by the following steps of:
   where an image displayed by the display device in the afterimage test is an image having a single color value, taking a brightness value of the afterimage displayed by the display device after the afterimage test, and taking an absolute value of a difference value between the brightness value after the afterimage test and the brightness value of the display device before the afterimage test as the brightness difference corresponding to the brightness value; or
   where an image displayed by the display device in the afterimage test includes black images and white images, taking brightness values of a group of afterimages corresponding to the black image and the white image after the afterimage test, and taking an absolute value of a difference value between brightness values of the group of afterimages corresponding to the black image and the white image as the brightness difference corresponding to the brightness value of the group.

5. The method according to claim 4, wherein the step of determining the afterimage level of the display device according to the determined brightness variation index and the determined area index if the image displayed by the display device in the afterimage test is the image having a single color value comprises:

when the afterimage displayed by the display has more than two brightness values after the afterimage test, as to one of the brightness values, determining the brightness variation index corresponding to the brightness value in accordance with the brightness difference corresponding to the brightness value, and obtaining the afterimage index corresponding to the brightness value in accordance with the product of the brightness variation index corresponding to the brightness value and the area index of the afterimage having the brightness value; and determining the afterimage level according to a result obtained by an addition of the afterimage indexes corresponding to all the brightness values.

6. The method according to claim 4, wherein the step of determining the brightness difference corresponding to each group of brightness values if the image displayed by the display device in the process of afterimage test includes the black images and the white images comprises:

selecting blocks in which afterimage occurs from all the blocks of the image displayed by the display device after the afterimage test, and determining the brightness value corresponding to each block in which afterimage occurs, wherein each block in all the blocks only includes an afterimage of the black image or only includes an afterimage of the white image or does not include any afterimage;

combining blocks with a same brightness value in all the blocks into an afterimage area; and combining an afterimage area of one black image and an afterimage area of one white image into an afterimage group, and as to one afterimage group, taking a difference value between brightness values of afterimages corresponding to the afterimage area of the black image and the afterimage area of the white image in the group as the brightness difference corresponding to the group, wherein a difference value between an absolute value of a difference value between a brightness value corresponding to the afterimage area of the black image in the same group and the brightness value of the image displayed by the display device before the afterimage test and an absolute value of a difference value between a brightness value corresponding to the afterimage area of the white image in the same group and the brightness value of the image displayed by the display device before the afterimage test is within a predetermined range; and the step of determining the afterimage level of the display device according to the determined brightness variation index and the determined area index comprises:

as to an afterimage group, according to the brightness difference corresponding to the afterimage group, determining the brightness variation index corresponding to the brightness difference, and obtaining an afterimage index corresponding to the afterimage group according to the product of the brightness variation index corresponding to the afterimage group and the area index corresponding to the afterimage group; and determining the afterimage level according to a result obtained from an addition of the afterimage indexes corresponding to all the afterimage groups.

7. A device for determining the afterimage level of a display device, comprising:

a first determination module configured to determine a brightness variation index and an area index of an afterimage displayed by the display device after an afterimage test, in which the brightness variation index of the afterimage refers to a percentage of a brightness difference of the afterimage displayed by the display device after the afterimage test with respect to a brightness value of the display device before the afterimage test, and the area index of the afterimage refers to a percentage of an area of the afterimage with respect to a display area of the display device; and a second determination module configured to determine the afterimage level of the display device according to the determined brightness variation index and the determined area index.

8. The device according to claim 7, wherein the brightness value of the display device before the afterimage test, determined by the first determination module, is the brightness value of the display device in the case of displaying an image having a single color value.

9. The device according to claim 7, wherein the second determination module is configured to determine the afterimage level of the display device according to a product of the determined brightness variation index and the determined area index of the afterimage.

10. The device according to claim 7, wherein the first determination module is configured to: if an image displayed by the display device in the afterimage test is an image having a single color value, take a brightness value of the afterimage displayed by the display device after the afterimage test, and take an absolute value of a difference value between the brightness value after the afterimage test and the brightness value of the display device before the afterimage test as the brightness difference corresponding to the brightness value; or if the image displayed by the display device in the afterimage test comprises a black image and a white image, take brightness values of a group of afterimages corresponding to the black image and the white image after the afterimage test, and take an absolute value of a difference value between the brightness values of the group of afterimages corresponding to the black image and the white image as the brightness difference corresponding to the brightness value of the group.

11. The device according to claim 10, wherein when the image displayed by the display device in the afterimage test is the image having a single color value, the first determination module is configured to: when the afterimage displayed by the display has more than two brightness values after the afterimage test, take one of the brightness values, determine the brightness variation index corresponding to the brightness value in accordance with the brightness difference corresponding to the brightness value, obtain the afterimage index corresponding to the brightness value in accordance with a product of the brightness variation index corresponding to the brightness value and the area index of the afterimage having the brightness value, and finally determine the afterimage level according to a result obtained by an addition of the afterimage indexes corresponding to all the brightness values.

12. The device according to claim 10, wherein if the image displayed by the display device in the afterimage test comprises a black image and a white image, the first determination module is configured to: select blocks in which afterimage occurs from all the blocks of the image displayed by the display device after the afterimage test, and determine the brightness value corresponding to each block in which afterimage occurs, in which each block in all the blocks only includes an afterimage of the black image or only includes an afterimage of the white image or does not include any afterimage; combine blocks with a same brightness value in all the blocks into an afterimage area; and combine an afterimage area of one black image and an afterimage area of one white image into an afterimage group, take one afterimage group, and take a difference value between brightness values of afterimages corresponding to the afterimage area of the black image and the afterimage area of the white image in the group as the brightness difference corresponding to the group, in which a difference value between an absolute value of a difference value between a brightness value corresponding to the afterimage area of the black image in the same group and the brightness value of the image displayed by the display device before the afterimage test and an absolute value of a difference value between a brightness value corresponding to the afterimage area of the white image in the same group and the brightness value of the image displayed by the display device before the afterimage test is within a predetermined range; and     the second determination module is configured to, as to an afterimage group, determine the brightness variation index corresponding to the brightness difference according to the brightness difference corresponding to the afterimage group, and obtain an afterimage index corresponding to the afterimage group according to a product of the brightness variation index corresponding to the afterimage group and the area index corresponding to the afterimage group; and determine the afterimage level according to a result obtained from an addition of the afterimage indexes corresponding to all the afterimage groups.

* * * * *